United States Patent
Colman et al.

(10) Patent No.: US 6,666,086 B2
(45) Date of Patent: Dec. 23, 2003

(54) AUTOMATIC BOILER LEVEL CONTROLLER

(75) Inventors: Mark A. Colman, Duluth, GA (US); Thomas E. Lee, Cupertino, CA (US)

(73) Assignee: Clark-Reliance Corporation, Strongsville, OH (US)

( * ) Notice: Subject to any disclaimer, the term of this patent is extended or adjusted under 35 U.S.C. 154(b) by 0 days.

(21) Appl. No.: 09/896,899

(22) Filed: Jun. 29, 2001

(65) Prior Publication Data

US 2002/0108440 A1 Aug. 15, 2002

Related U.S. Application Data

(60) Provisional application No. 60/215,604, filed on Jun. 30, 2000.

(51) Int. Cl.$^7$ .................. G01F 23/00; G01F 17/00; G01F 1/12; G08B 21/00
(52) U.S. Cl. .................. 73/304 C; 340/620; 702/52; 702/100
(58) Field of Search .................. 73/304 C, 290 R; 702/52, 100; 340/620

(56) References Cited

U.S. PATENT DOCUMENTS

| | | | | |
|---|---|---|---|---|
| 4,199,984 A | * | 4/1980 | Huddart et al. | 73/304 C |
| 4,385,290 A | * | 5/1983 | Fiala | 340/620 |
| 4,819,483 A | * | 4/1989 | Emplit et al. | 73/304 C |
| 5,005,409 A | * | 4/1991 | Hochstein | 73/304 C |
| 5,121,632 A | * | 6/1992 | Keeler et al. | 73/304 C |
| 5,216,409 A | * | 6/1993 | Ament et al. | 340/438 |
| 5,528,520 A | * | 6/1996 | Kemp | 364/571.04 |
| 5,626,052 A | * | 5/1997 | Lawson | 73/304 C |

* cited by examiner

*Primary Examiner*—Hezron Williams
*Assistant Examiner*—Katina Wilson
(74) *Attorney, Agent, or Firm*—Calfee, Halter & Griswold LLP

(57) ABSTRACT

An improved boiler water-level controller. According to one aspect of the present invention, a positive blowdown signal is presented to indicate to the operator that the alarm probe is in steam; performing blowdown until this indicator turns on helps ensure that the alarm probe is working properly. According to another aspect of the present invention, the controller uses a novel methodology of sensing water level using conductivity probes. An embodiment of this methodology uses the charging and discharging of a capacitor through a resistive value to sense the presence of water.

10 Claims, 11 Drawing Sheets

AUTOMATIC BOILER LEVEL CONTROLLER

CROSS-REFERENCE TO RELATED APPLICATIONS

This application claims priority to U.S. Provisional Patent Application No. 60/215,604 filed Jun. 30, 2000, the entire disclosure of which is hereby incorporated by reference herein.

FIELD OF THE INVENTION

The present invention relates generally to the field of feed-water level control in boilers, and more specifically to an automatic boiler level controller having an improved water level sensing methodology and a positive blowdown circuit to ensure that the alarm probe is free of debris or buildup.

BACKGROUND OF THE INVENTION

Steam boilers are used in various applications, e.g., generation of electricity with steam turbine generators. In typical boilers a burner burns fuel from a fuel supply to create heat to generate steam from feed-water inside the boiler and the steam is piped to a generator or other system. Thus, typical boilers have both steam and feed-water inside them. It is known that the level of feed-water inside a boiler must be kept above a certain level. It is also known in the art to use a controller and one or more conductivity sensors to automatically control the level of feed-water in the boiler by controlling a boiler feed pump that provides additional feed-water to the boiler when the feed-water level falls to below a first level. It is also known to provide an alarm and/or turn off the fuel supply to the burner when the feed-water level falls to below a second, lower level.

It is known in the art of boiler level control to sense the water level inside the boiler using conductivity sensors located inside a column positioned outside the boiler but in fluid connection with the boiler. The lowest conductivity sensor is typically the alarm sensor. One known problem with this known configuration is that debris can build up around the alarm sensor causing false readings, e.g., the alarm conductivity sensor is in steam, but debris surrounding the alarm sensor provides a conductive path causing the controller to falsely determine that the alarm sensor is in water. A known solution to the debris problem is to use pressure from steam to "blow down" the debris away from the alarm sensor by opening a blow down valve. This blowdown procedure has the additional effect of lowering the water level in the column containing the conductivity probes, which can be problematic, because as the water is blown down from the various conductivity probes, the controller falsely determines that the level of water in the boiler is lowering and turns on the feed-water pump and/or triggers an alarm and/or shuts off the fuel to the burner. A typical way to overcome this problem is to add circuitry that bypasses the control signals from the controller during blowdown. This prevents false alarms during blowdown, but does not provide any indication as to whether the blowdown process is complete or effective.

Additionally, the circuits typically used to determine water level with conductivity probes are relatively complex with a relatively high parts count.

There is a need, therefore, for an improved boiler controller.

SUMMARY OF THE INVENTION

The present invention is directed toward an improved boiler controller. According to one aspect of the present invention, a positive blowdown signal is presented to indicate to the operator that the alarm probe is in steam; performing blowdown until this indicator turns on helps ensure that the alarm probe is working properly. According to another aspect of the present invention, the controller uses a novel methodology of sensing water level using conductivity probes. An embodiment of this methodology uses the charging and discharging of a capacitor through a resistive value to sense the presence of water.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example the principles of this invention, wherein.

DETAILED DESCRIPTION OF THE INVENTION

The automatic boiler level controller 10 according to the present invention is a microprocessor-based controller with a built in watch dog timer. The controller 10 includes many self diagnostic and safety features. It has the ability to detect out of sequence probe indications and alert the operator of a problem with the controller's sensing circuit. Along with the out of sequence logic, the controller 10 includes a positive blowdown circuit. During the blowdown, the controller 10 signals the operator that the alarm sensor has sensed steam. This feature ensures that the alarm probe is free of debris or build up. The controller uses proven conductivity technology to sense water level and uses a very unique methodology of sensing the conductivity: the I/O (input/output) ports of the microprocessor and the charging and discharging of a capacitor through a resistive value senses the presence of water.

Figure 1:
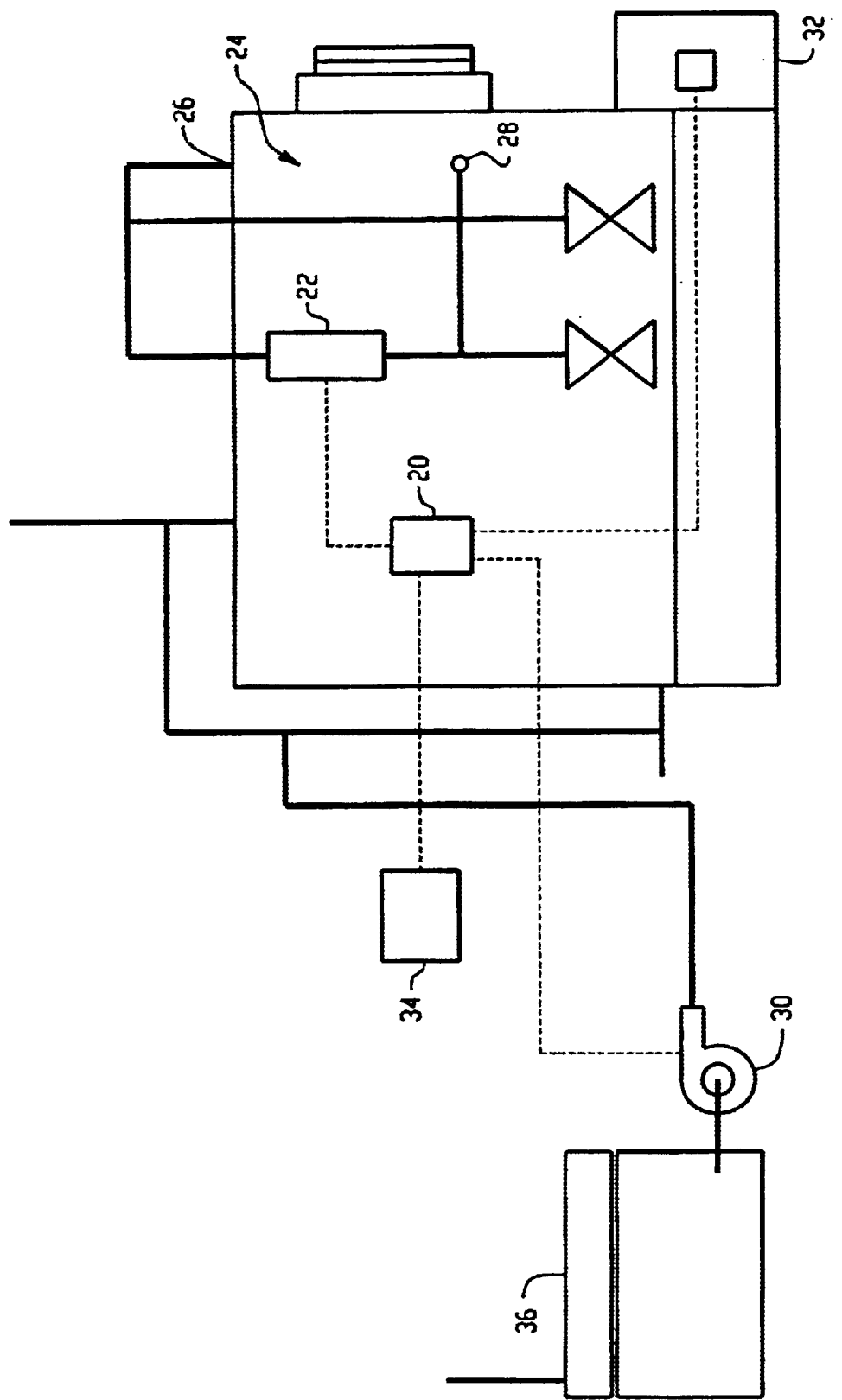
FIG. 1 is a block diagram of a typical boiler level control installation.
Figure 2:
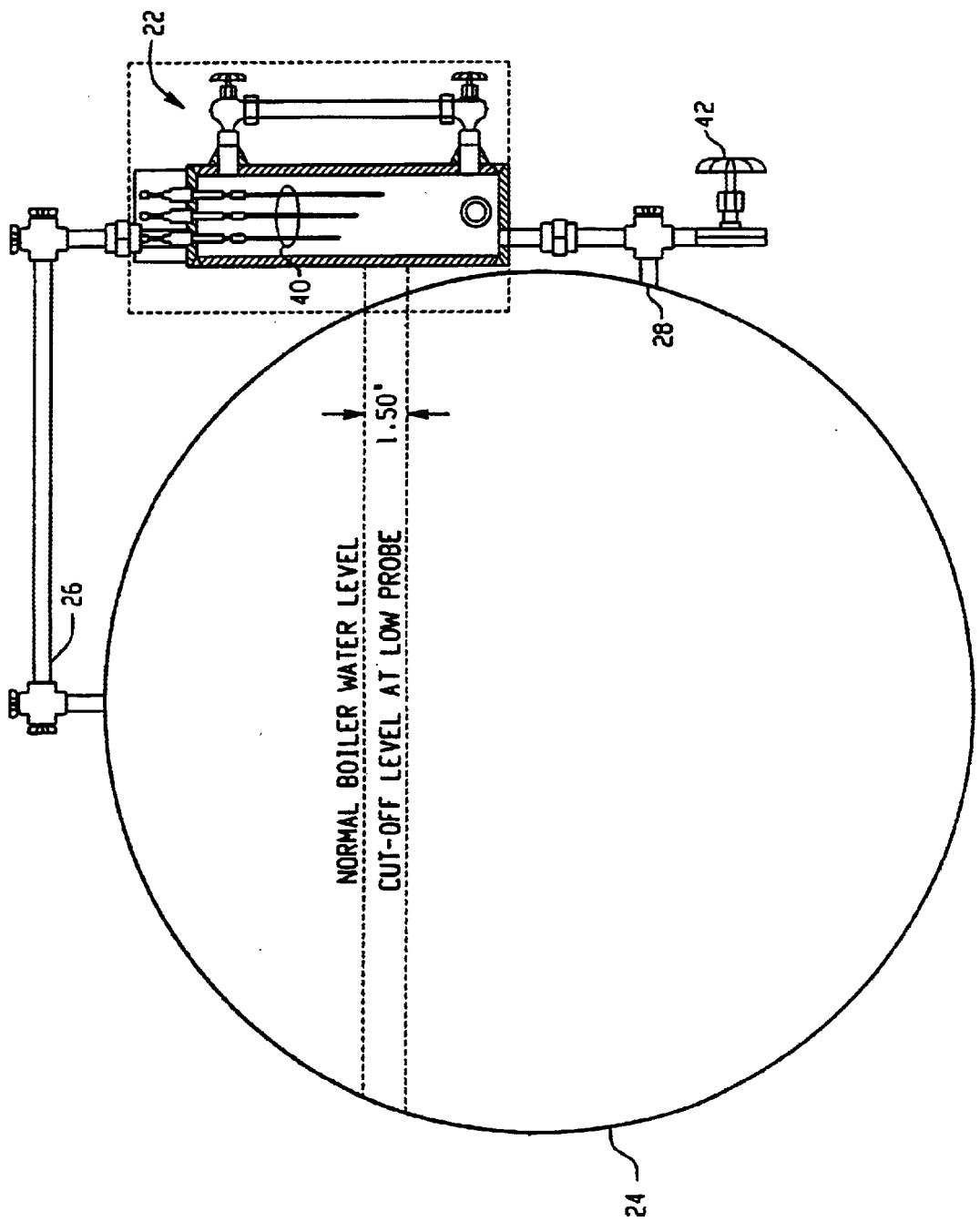
FIG. 2 is an end view of a typical boiler showing the probe column in cross-section.
Figure 3:
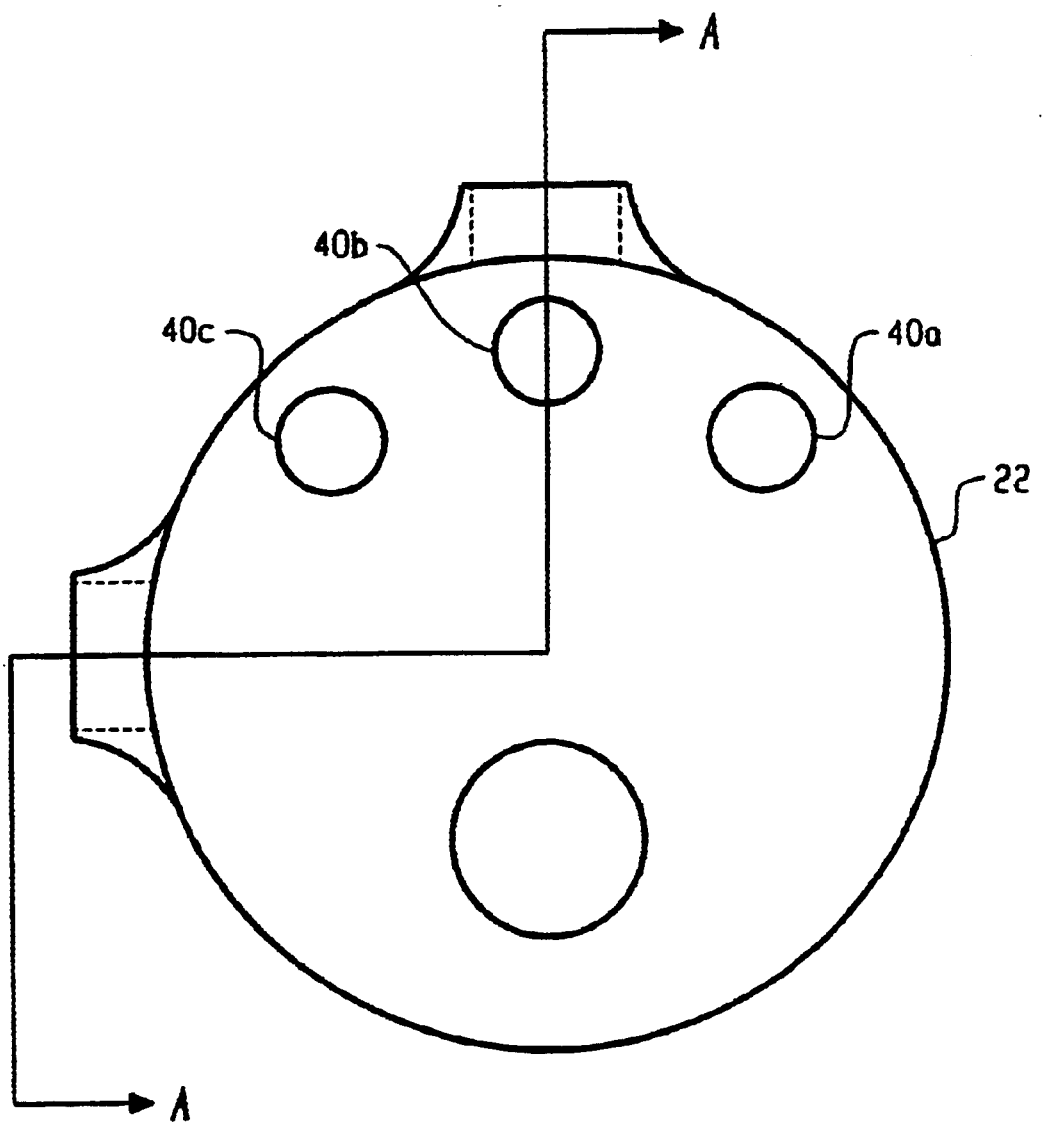
FIG. 3 is a top view of the probe column.
Figure 4:
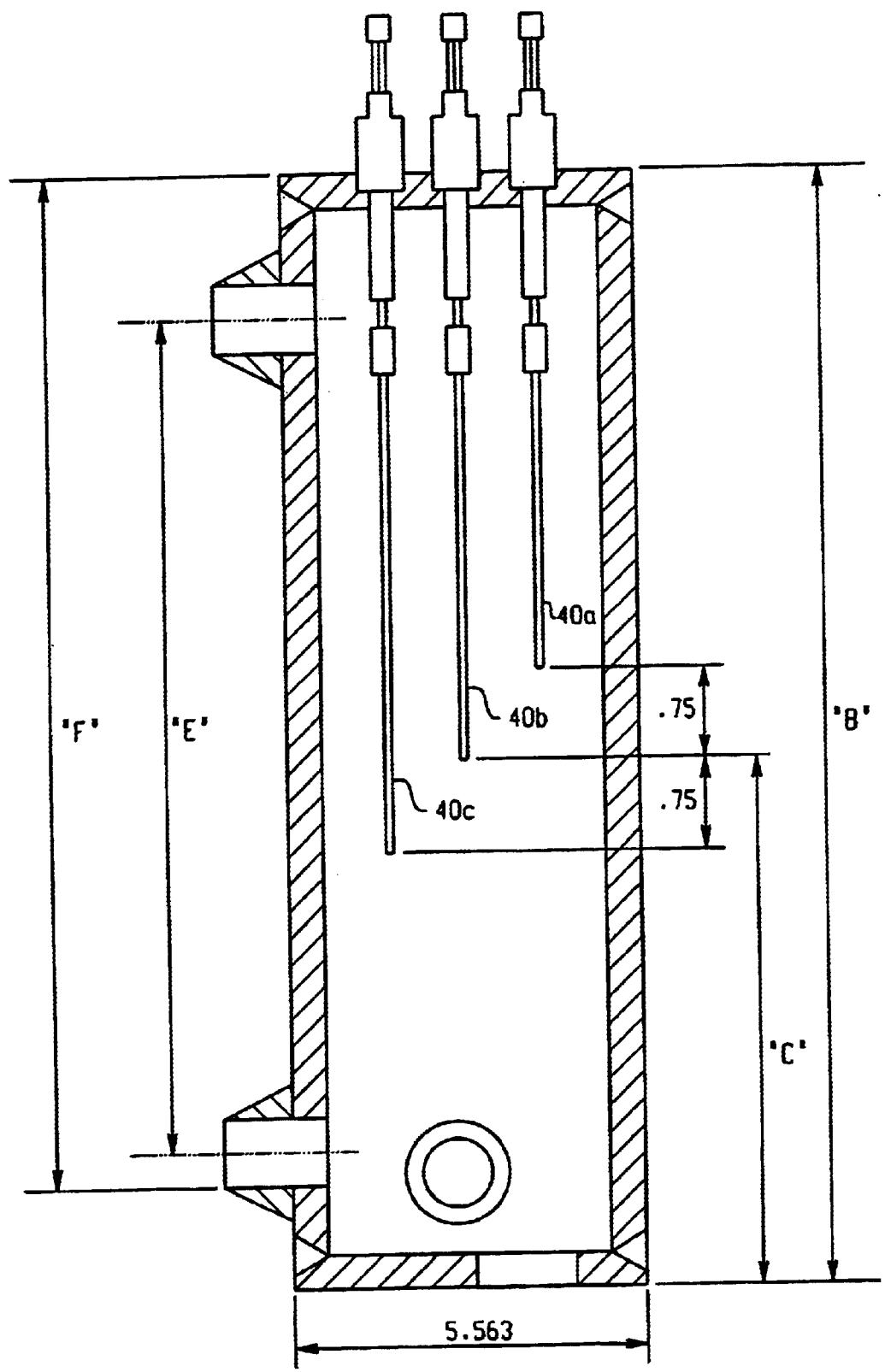
FIG. 4 is a cross-sectional view of the probe column taken along path AA in FIG. 3 with the conductivity probes rotated for clarity.
Figure 7:
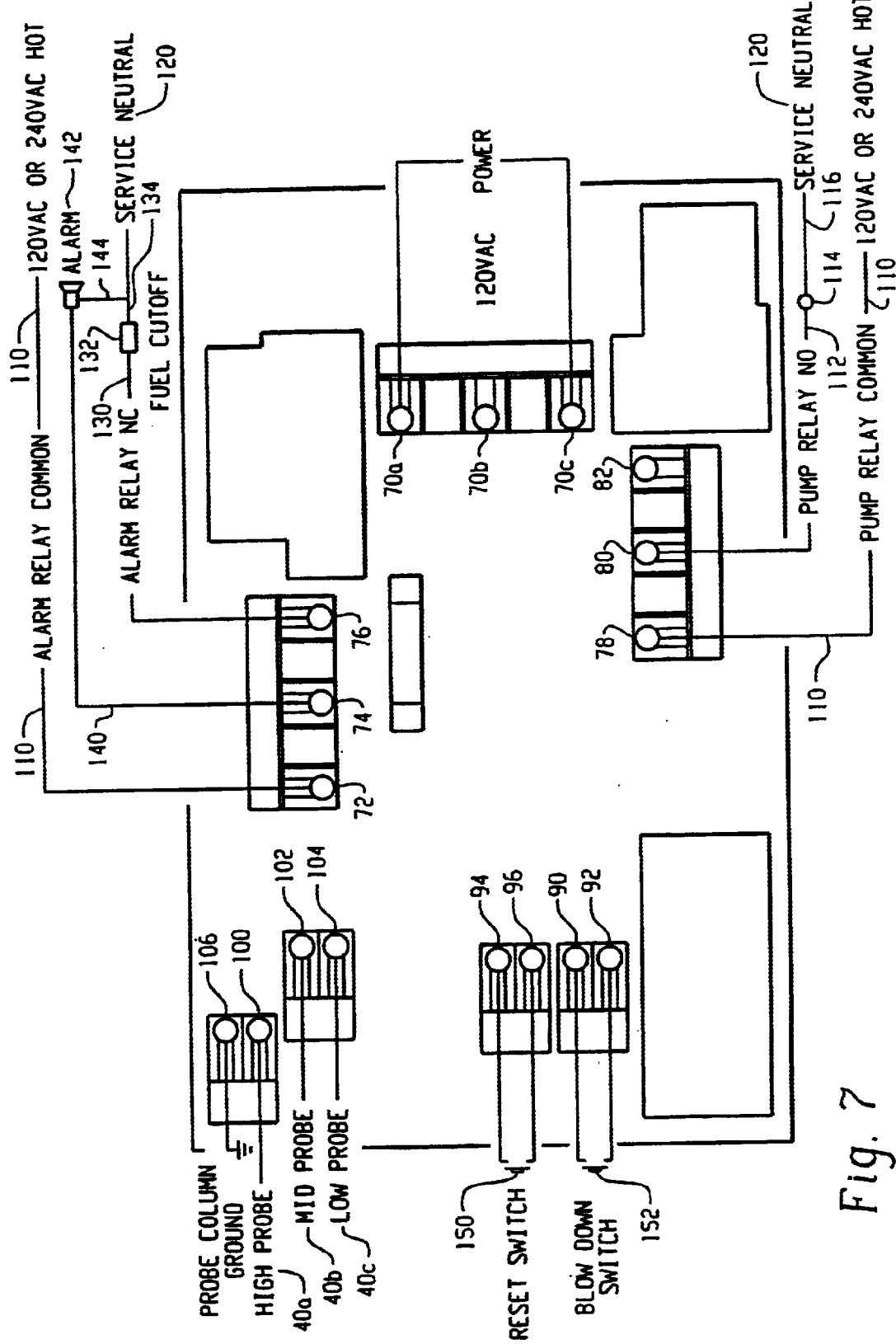
FIG. 7 is a block diagram showing an example configuration of the controller of the present invention that provides pump control and fuel cutoff with alarm.
Figure 8:
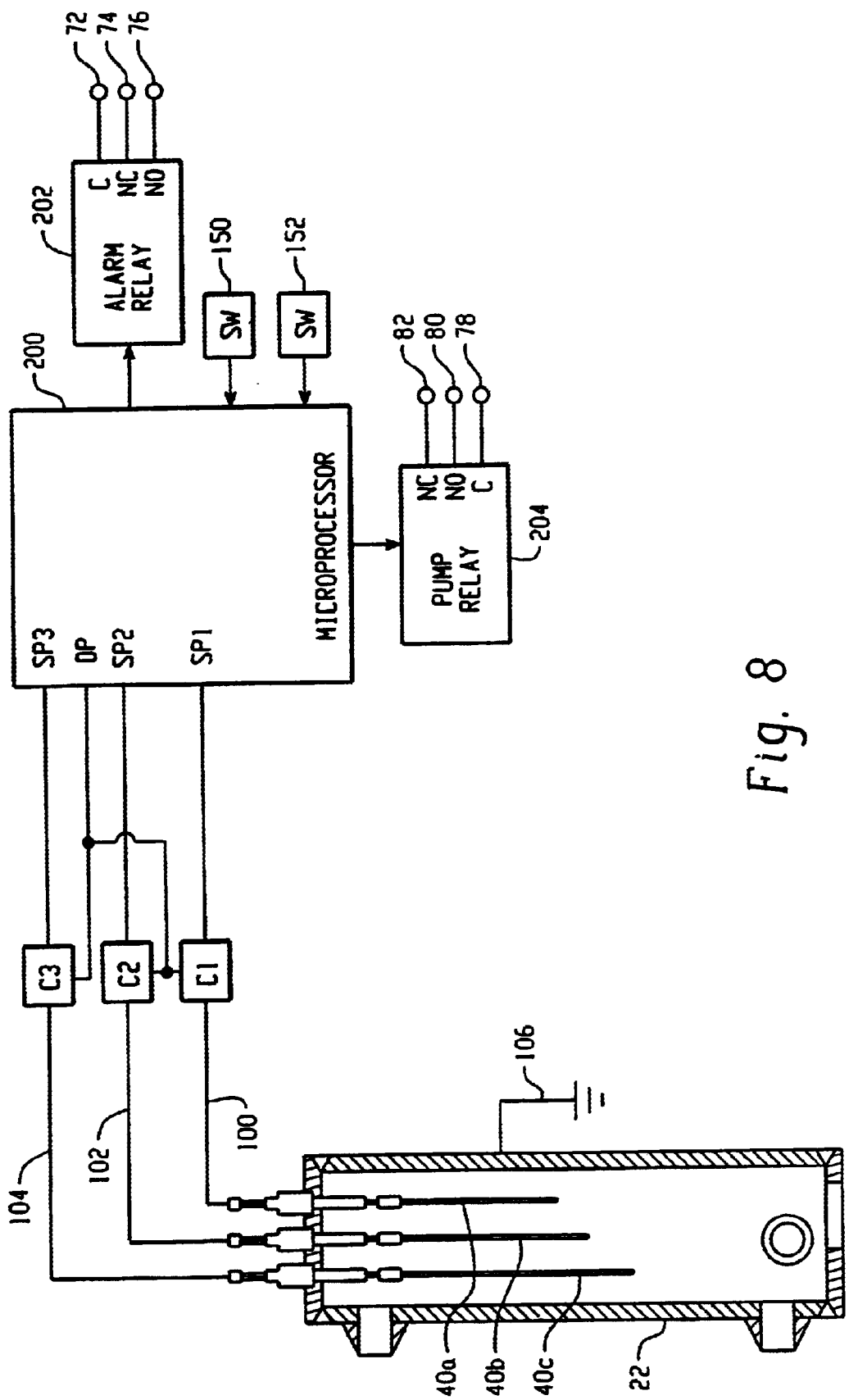
FIG. 8 is a schematic block diagram showing the sensing configuration of the controller of the present invention.

FIG. 1 shows a typical boiler level control installation. A pump control and low water cut-off circuit 20 is connected to a water column 22. Water column 22 is connected to steam boiler 24 by a steam connection 26 located at the top of the boiler 24 and by a water connection 28 located near the middle of the boiler 24. The circuit 20 controls a boiler feed pump 30, controls the burner 32, and controls an alarm 34. The boiler feed pump pumps feed-water from a water source, e.g., condensate receiver 36 to the boiler 24. FIG. 2 shows a probe column 22 having a plurality of conductivity probes 40 and further shows a blow down valve 42 in fluid communication with the probe column 22 and with the water connection 28 of boiler 24. The probe column 22 is in circuit communication with controller according to the present invention as shown in FIGS. 7 and 8. FIG. 3 shows three conductivity probes 40a, 40b, and 40c positioned inside probe column 22. As shown in FIG. 4, these three probes 40a, 40b, and 40c are of three different lengths that extend into the probe column 22 to three different depths. In the probe column shown in FIG. 4 the tip of upper probe 40a is 0.75" higher than the tip of middle probe 40b and the tip of middle probe 40b is 0.75" higher than the tip of lower probe 40c. The controller 10 will maintain the water level in the boiler 24 between the high probe 40a and middle probe 40b of the probe column 22. If the water level falls to the low level probe 40c in the column 22 the alarm and fuel cut-off circuit will be activated cutting off the fuel to the burner and sound an alarm. The vertical position of the probe column 22 on the boiler 24 is very important. Improper positioning of the probe column 22 could result in damage to the boiler 24 and possible injury to operating personnel. It is recommended that all installation be done in accordance with the original boiler manufacturer's recommendations. If no such recommendations exist, position the high level probe 40a so that it matches the position of the normal water level in the boiler drum. By setting the high probe 40a at the normal water level the controller 10 will maintain the water level between the high level probe 40a and the middle probe 40b. The distance between the high probe 40a and the middle probe 40b is ¾ inch. The water level will be allowed to fall an additional ¾ inch to the low probe 40c before the alarm circuit will be activated. Thus, the total distance between the high probe 40a and the low probe 40c is 1½ inches.

Figure 5:
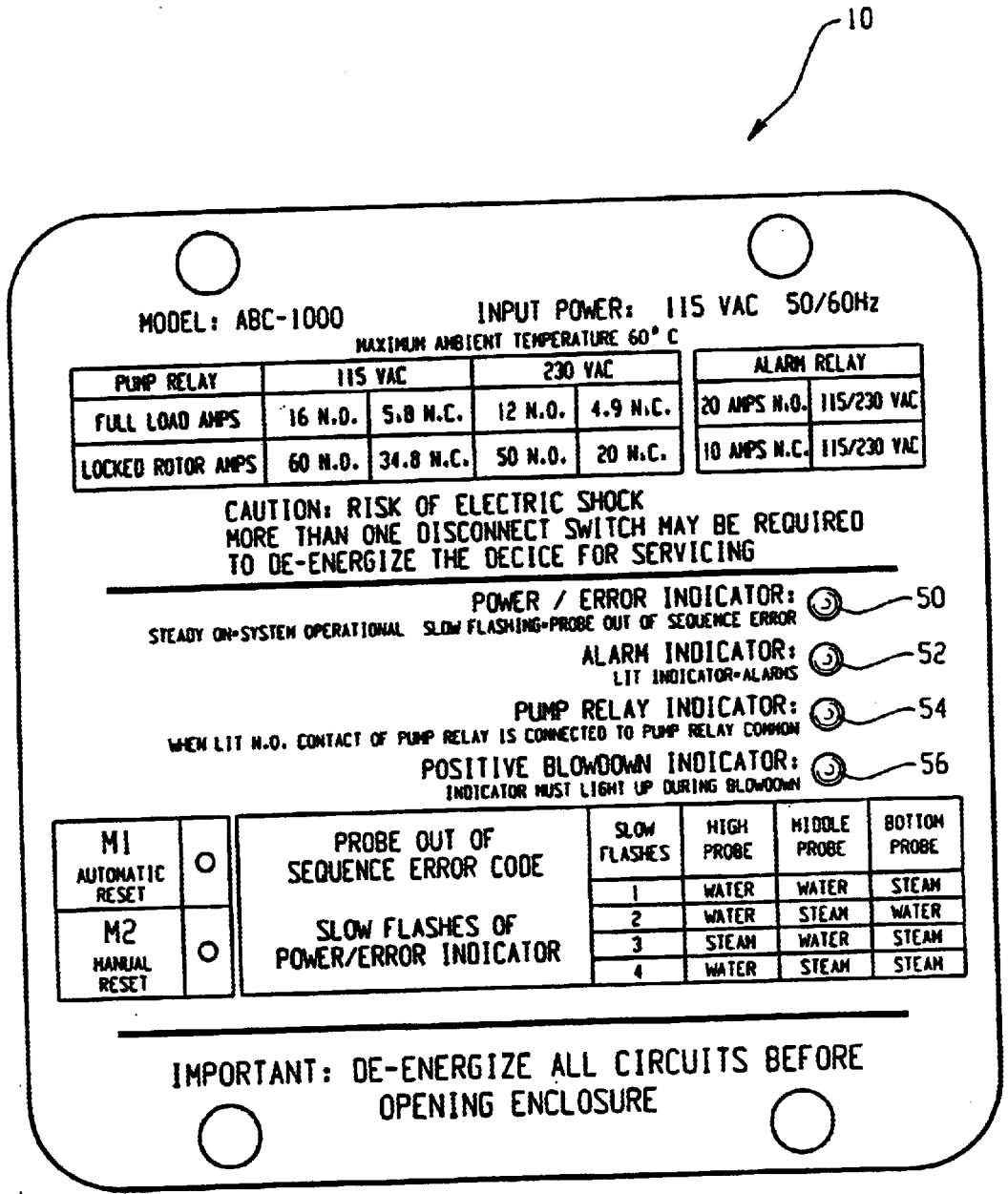
FIG. 5 is a front plan view of the front cover of the controller of the present invention showing various indicators.

As shown in FIG. 5, the controller 10 according to the present invention generates four indicators: power/error indicator 50, an alarm relay indicator 52, a pump relay (energized) indicator 54, and a positive blowdown indicator 56. The controller 10 illuminates the power/error indicator 50 steady on to indicate normal operation and causes the power/error indicator 50 to slowly blink to indicate specific alarm conditions. The controller 10 illuminates the alarm relay indicator 52 to indicate that alarm condition exists. When an alarm condition exists, the controller 10 causes the power/error indicator 50 to display a number of flashes corresponding to an error condition (see Tables 1 and 2), thus permitting an operator observing the error code on the power/error indicator 50 to diagnose the specific error condition.

The controller 10 is able to diagnose problems with the probes 40 and probe wires. These are diagnosed as out of sequence errors. When a problem occurs, the controller will put the ALARM RELAY into the alarm state and continuously flash an error code. The error code will show a number of sequential flashes, followed by a longer interval. The error code is repeated in this manner. When the error condition is resolved, the error state can be cleared by pushing a user installed reset switch. A reset switch will not clear the error state until the error condition is resolved. Table 1 shows the error probe out of sequence codes flashed by the power/error indicator 50 during an out of sequence error condition:

TABLE 1

| | PROBES | | |
|---|---|---|---|
| Slow Flashes | High | Middle | Low |
| 1 | Water | Water | Steam |
| 2 | Water | Steam | Water |
| 3 | Steam | Water | Steam |
| 4 | Water | Steam | Steam |

For example, if liquid level was above the middle probe 40b (and below the upper probe 40a), and the low probe 40c were to become disconnected, then the controller would sense steam for the high probe 40a, water for the middle probe 40b, and steam for the low probe 40c. The controller 10 would then set the ALARM RELAY into the alarm state and repeatedly flash the error code of three slow flashes (followed by a longer interval).

The controller 10 illuminates the pump relay (energized) indicator (LED) to indicate that the pump relay (not shown) is energized and the normally open contact is connected to relay common (i.e., closed). The controller 10 lights the positive blowdown indicator 56 to indicate that the low probe 40c is in steam. As discussed further below, blowdown should proceed until this indicator turns on to ensure that the low level probe is working properly.

Along with the ability of the controller 10 to detect problems with the probes and probe wires, the controller 10 also has the ability to detect and display many other error conditions that may arise. The following is a description of the general errors that the controller will detect: (i) blow down time out: if the normally-open momentary contact switch 152 (FIG. 7) connected between the terminal blocks 90,92 labeled "Blow Down" (FIGS. 7–8) is held closed for more than two minutes then the controller 10 will enter to into an alarm state; (ii) system hardware errors I and II: the controller 10 has the ability to detect faults that may occur with in its own circuitry and if this were to occur, a system hardware fault will be displayed on the indicator; and (iii) low level alarm: this error will flash when under normal operation the low level probe senses steam. Table 2 shows the error probe out of sequence codes flashed by the power/ error indicator 50 for the foregoing error conditions:

TABLE 2

| Slow Flashes | Description |
| --- | --- |
| 5 | Blow Down Time Out |
| 6 | System Hardware Error I |
| 7 | System Hardware Error II |
| 8 | Low Probe in Steam |

Figure 6:
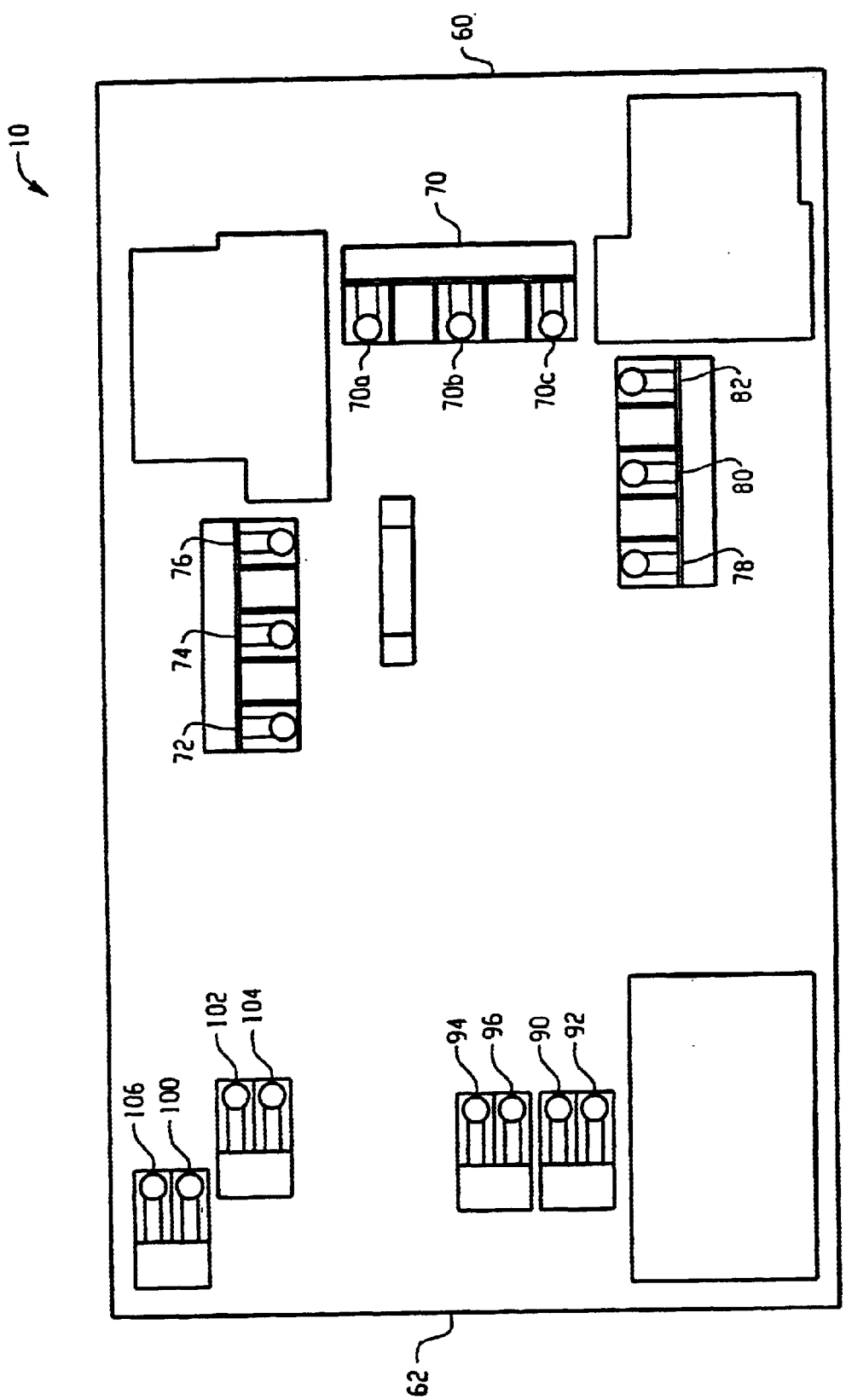
FIG. 6 is a block diagram showing the back cover of the controller of the present invention indicating various connections to the controller.

The electronics for the controller 10 are located on the backside of the controller's enclosure cover. As shown in FIG. 6, the electronics for the controller 10 are divided into two sides: a high voltage side 60 and a low voltage side 62. The following identifies and describes the components on the board. On the high voltage side 60, the controller has: (i) a controller power 120 VAC terminal block connections 70 for power to the controller electronics (the controller input voltage is factory set at 120 VAC); (ii) an alarm relay common terminal block connection 72 to (SPDT) alarm relay common; (iii) an alarm relay normally closed terminal block connection 74 to (SPDT) alarm relay normally closed contact (this contact makes connection to the relay common 72 when an alarm condition occurs); (iv) an alarm relay normally open terminal block connection 76 to (SPDT) alarm relay normally open contact (this contact makes connection to the relay common 72 when no alarm condition occurs); (v) a pump relay common terminal block connection 78 to (SPDT) pump relay common; (vi) a pump relay normally open terminal block connection 80 to (SPDT) pump relay normally open contact (this contact makes connection to the relay common 78 when liquid level falls below the middle probe 40b level); (vii) a pump relay normally closed terminal block connection 82 to (SPDT) pump relay normally closed contact (this contact makes connection to the relay common 78 when liquid level reaches the high probe 40a level). Use copper conductors only to connect to the high voltage side 60.

On the low voltage side 62, the controller 10 has: (i) blow down 1 90 & blow down 2 92 terminal block connections, (ii) reset 1 94 & reset 2 96 terminal block connections, and (iii) probe terminal block connections: high probe terminal block connection 100, middle probe terminal block connection 102, low probe terminal block connection 104, and probe ground terminal block connection 106. The blow down 1 terminal block connection 90 and blow down 2 terminal block connection 92 can be connected to a momentary, normally open switch 152 (FIG. 7). When blow down 1 90 is connected to blow down 2 92, the controller 10 will stop controlling the relays (the alarm relay and the pump relay). This switch contact is designed to allow the operator to blow down the probe column 22 without tripping the fuel cut out and alarm circuit. The controller 10 will return to normal operation once the connection between blow down 1 90 and blow down 2 92 is broken or after a period of two minutes, which ever comes first.

The reset 1 terminal connection 94 and reset 2 terminal connection can be used to implement system reset in two ways: automatic reset (m1) and manual reset (m2). For automatic reset (m1), a jumper wire in placed across reset 1 and reset 2 terminal block connections 94, 96. If an error is detected, once the level is back above the low level probe, the alarm will automatically reset. After the error condition has been corrected the alarm normally closed relay connection will once again be closed, and the normally open relay connection will be opened. For manual reset (m2), reset 1 and reset 2 terminal block connections 94, 96 are connected to a momentary, normally open switch 150 (FIG. 7). After any error has been detected and corrected, connect reset 1 94 to reset 2 to reset the alarm relay, e.g., with switch 150. After reset 1 94 is connected to reset 2 96 and the error condition has been corrected, the alarm normally closed relay connection will once again be closed, and the normally open relay connection will be opened.

As to the probe connections, the high probe terminal block connection 100 is connected to the high probe 40a, the middle probe terminal block connection 102 is connected to the middle probe 40b, the low probe terminal block connection 104 is connected to the low probe 40c, and the probe ground terminal block connection 106 is connected to the ground screw (not shown) located on the controller's probe column 22. All low voltage wiring to the controller 10 is required to be wired using NEC Class 1 wiring.

FIG. 7 shows an example configuration for the controller 10 that includes pump control and fuel cutoff, with alarm. In this example, the controller 10 controls power to the pump to keep the water level between the high level probe 40a and the middle level probe 40b. If the water level falls below the low probe 40c, or if a failure to sense water is detected, the controller 10 cuts power to the fuel control valve and sounds an alarm. As to power connections, with the power off, connect 120 VAC service wires to the two terminal block positions 70 labeled "POWER 120 VAC." The power input terminal block 70 has three positions. Only two of the three positions are used. The center position is not to be used and is not connected to any circuits of the controller board. As to pump connections, connect the high voltage service wire 110 to the terminal block position 78 labeled PUMP COM (PUMP RELAY COMMON), connect the terminal block connection 80 labeled PUMP NO (PUMP NORMALLY OPEN) to the hot side 112 of the pump motor 114 or pump motor controller, and connect the neutral side 116 of the pump motor 114 to the neutral service wire 120. The controller 10 PUMP RELAY can directly control a motor rated for 16 full load Amps at 120 VAC or 12 full load Amps at 240 VAC. If the pump motor has a higher current rating, do not connect the pump directly to the controller 10. As to fuel cutoff connections, connect the high voltage service wire 110 to the terminal block 72 labeled ALARM COM (ALARM RELAY COMMON), connect the terminal block position labeled ALARM NC (ALARM NORMALLY CLOSED) to the hot side 130 of the fuel valve solenoid 132, and connect the neutral wire 134 from the fuel valve solenoid 132 to the neutral service wire 120. If an alarm is desired, connect the terminal block position labeled ALARM NO (ALARM NORMALLY OPEN) to the hot side 140 of alarm 142 (make sure that the alarm is rated for the same high voltage as the solenoid) and connect the neutral wire 144 from the alarm 142 to the neutral service wire 120. The controller 10 ALARM RELAY can directly control 20 full load resistive Amps at 120 VAC or 240 VAC. If the alarm 142 or the fuel valve solenoid 132 has a higher current rating, do not connect these directly to the controller 10. As to the probe connections, connect the terminal block position 106 labeled PROBE GND to the grounding screw on the probe column 22, connect the terminal block position 104 labeled PROBE LOW to the lowest probe 40c of the three probes on the probe column 22, connect the terminal block position 102 labeled PROBE MID to the middle probe 40b on the probe column 22, and connect the terminal block position 100 labeled PROBE HI to the highest probe 40a on the probe column 22. As to reset connections, for an Automatic reset alarm, connect the two terminal block positions 94, 96 labeled RESET with a jumper wire and for a Manual reset alarm, connect the two terminal block positions 94, 96 labeled RESET to a normally open momentary switch 150. As to blow down connections, connect the two terminal block positions 90, 92, labeled BLOW DOWN to a second normally open momentary switch 152. Do not run wires from the low voltage probes, probe ground, reset and blow down switches in the same conduit as high voltage service wires.

FIG. 8 is a schematic block diagram showing the processor 200 of controller 10 and some of the components connected thereto. In this block diagram, the switches 150, 152 are connected to (not necessarily directly connected to) processor 200, as are the alarm relay 202 and the pump relay 204. Additionally, there are certain capacitive circuits connected to the processor 200, one for each probe 40. These capacitive circuits allow the controller 10 to sense the water level using conductivity probes 40. More specifically, in FIG. 8, there are three capacitive circuits, C1, C2, and C3, connected to the processor 200. The three capacitive circuits C1, C2, and C3 are connected to the processor 200 by a driving pin DP and three sensing pins SP1, SP2, and SP3. The driving pin DP and the sensing pins SP1, SP2, and SP3 are under control of the microprocessor 200, making them either an input (high impedance) or an output (low impedance). Driving pin DP is connected through SP1, SP2, SP3 through a small value capacitor. Sensing pins SP1, SP2, and SP3 are connected to (not necessarily directly connected to) probes 40a, 40b, and 40c. As discussed above, controller 10 uses proven conductivity technology to sense water level and uses a very unique methodology of sensing the conductivity: the I/O (input/output) ports of the microprocessor 200 and the charging and discharging of a capacitor through a resistive value sense the presence of water.

Figure 9:
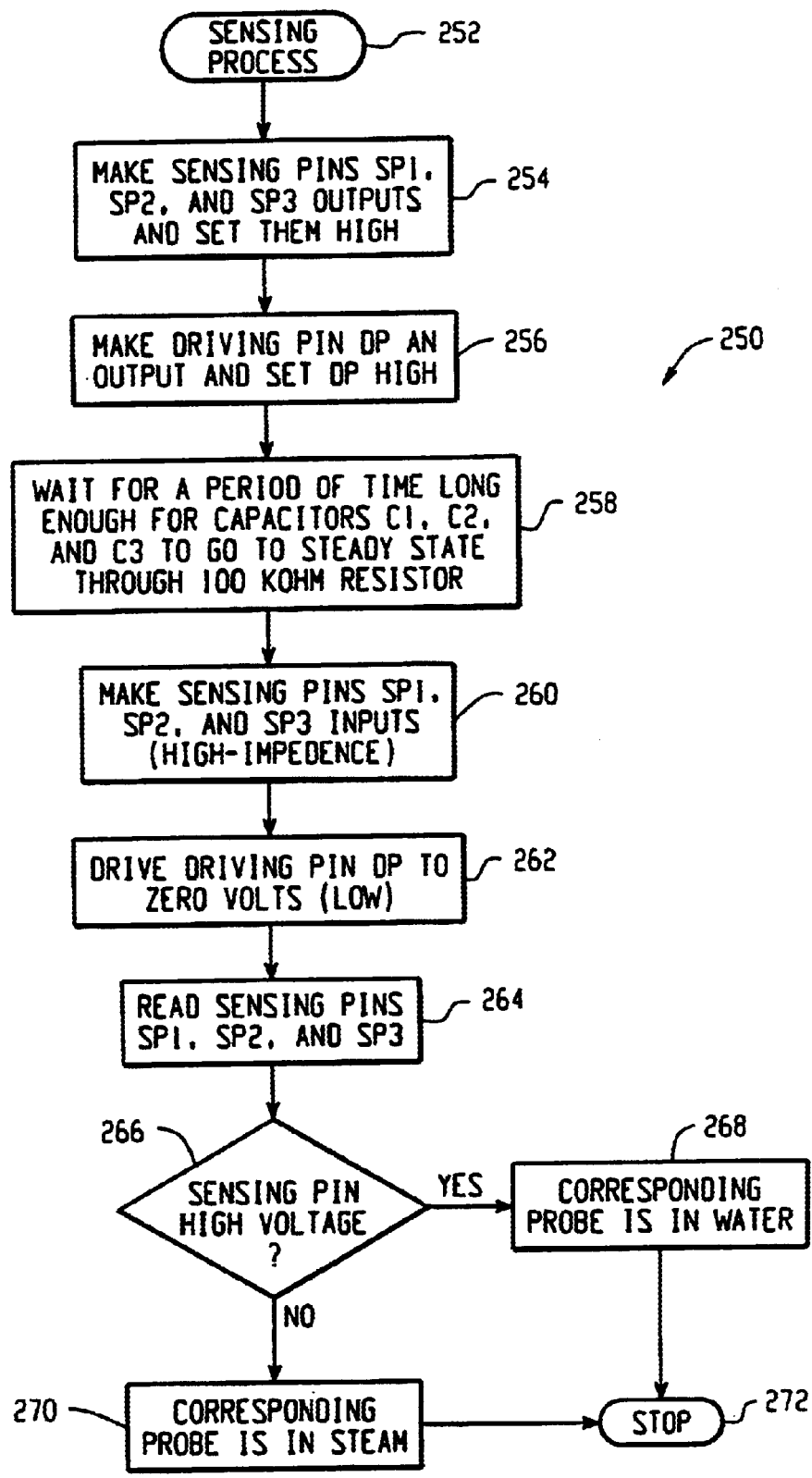
FIG. 9 is a flow chart showing the sensing process used by the controller of the present invention to determine whether the conductivity probes are in water or in steam.

The process by which processor 200 uses capacitive circuits C1, C2, and C3 to sense water level is shown in FIG. 9. The software routine starts at 252. First the processor 200 makes sensing pins SP1, SP2, SP3 outputs and sets them HIGH, at 254, and at 256, the processor makes driving pin DP an output and sets it HIGH. Then the software waits long enough for capacitors C1, C2, C3 to go to steady state through a 100K ohm resistor, at 258. Next, at 260, the processor 200 makes sensing pins SP1, SP2, SP3 all inputs, and drives the driving pin DP to zero volts (LOW), at 262. Next, the processor reads sensing pins SP1, SP2, SP3, at 264. Then, at 266, if a pin is HIGH voltage, the corresponding probe is in water (voltage does not go through the 100 K resistor), at 268, and if the pin is LOW voltage, the probe is in steam (voltage goes through the 100 K resistor), at 270, and the routine ends at 272.

Figure 10:
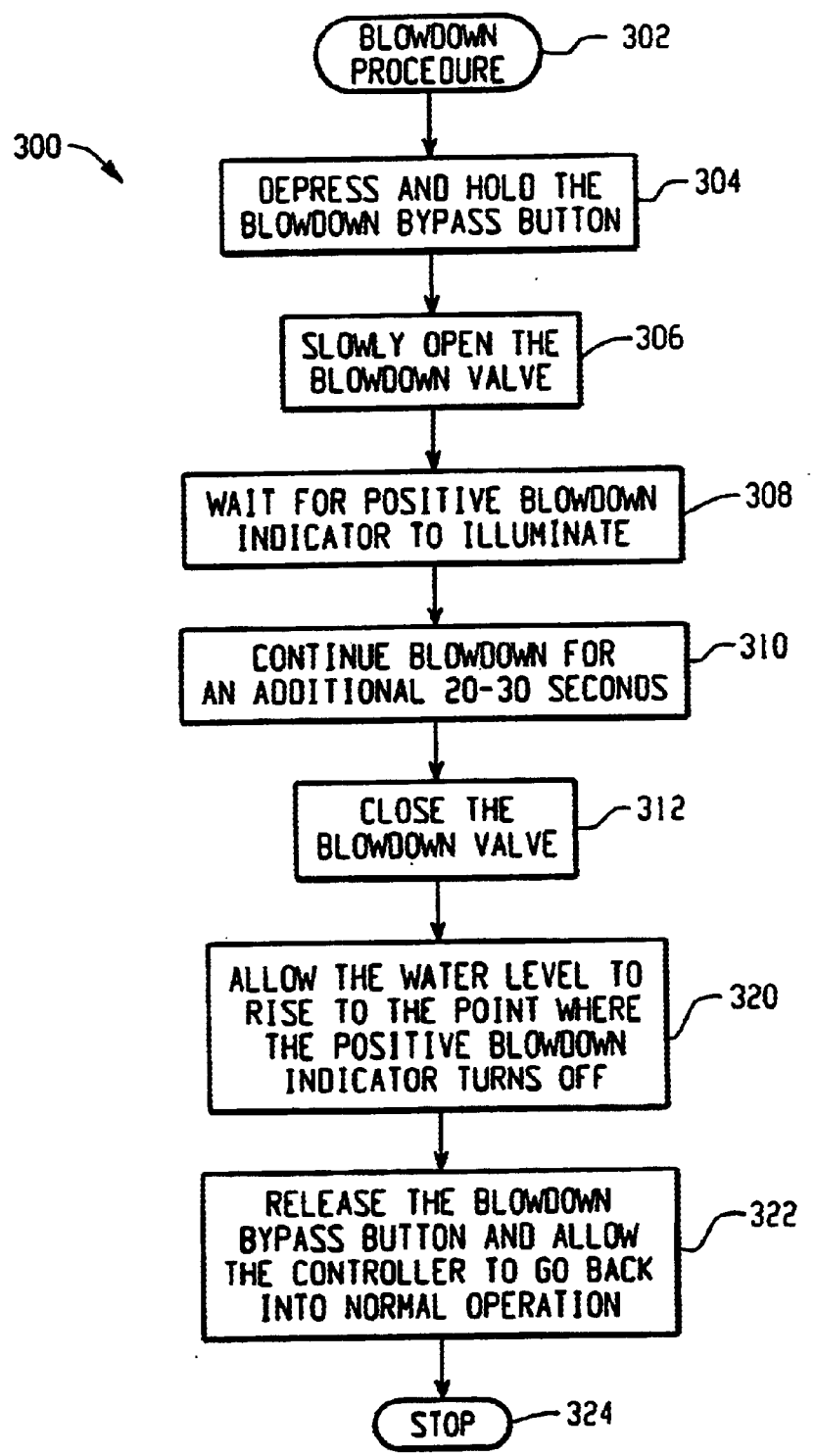
FIG. 10 is a flow chart showing the procedure used during blowdown.
Figure 11:
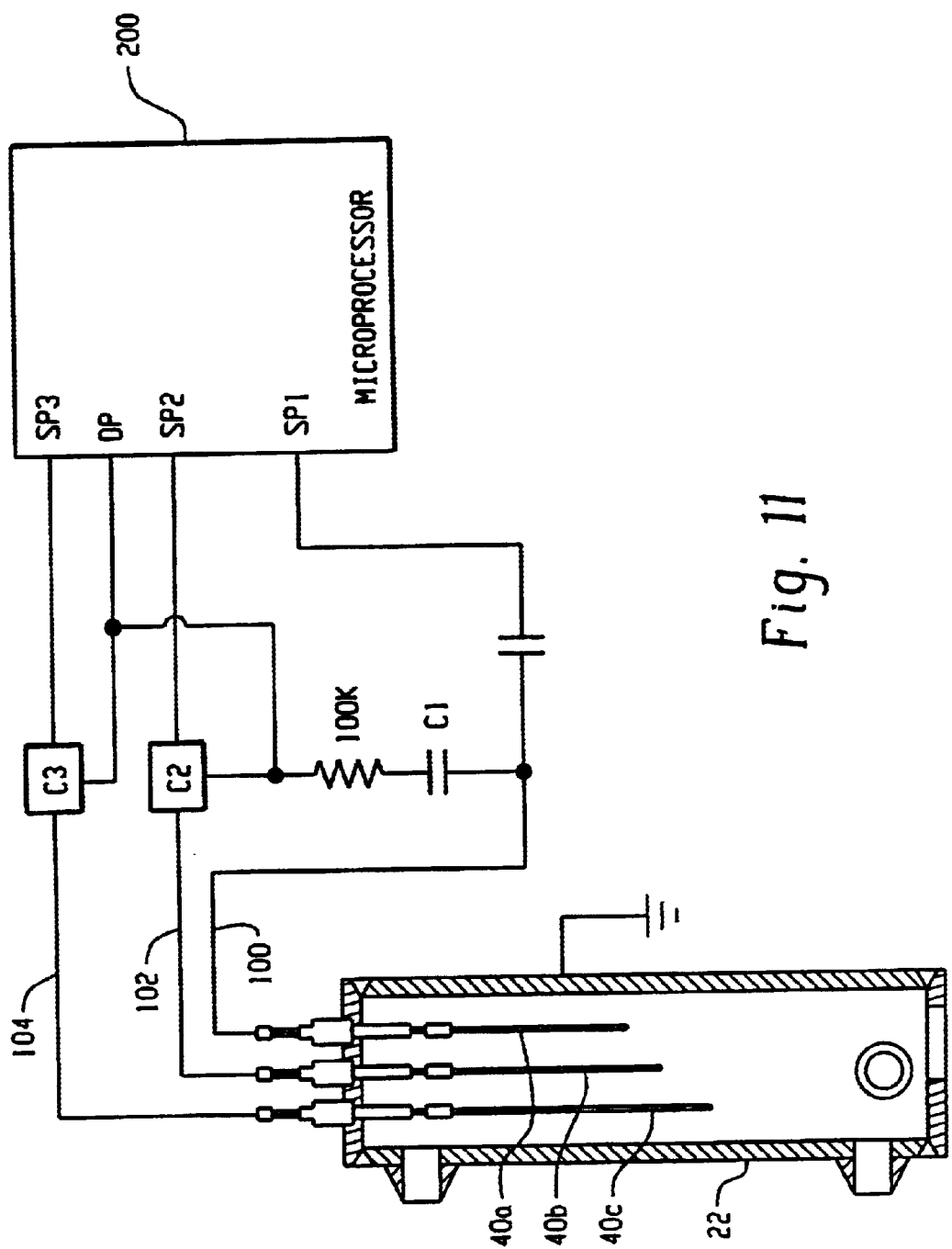
FIG. 11 is a schematic block diagram showing another embodiment of the sensing configuration of the controller of the present invention; and The Appendix is a copy of U.S. Provisional Patent Application No. 60/215,604 filed Jun. 30, 2000, the entire disclosure of which was incorporated by reference above.

As discussed above, the controller 10 has a positive blowdown circuit to ensure that the alarm probe is free of debris or buildup. The probe column 22 must be blown down once a day. FIG. 10 shows the blowdown procedure 300. The procedure starts at 302. To perform the blow down, the operator first depresses and holds the blowdown bypass button 152, at 304. Next, the blowdown valve 42 is slowly opened, at 306. When the controller determines that low level probe 40c is in steam, the positive blow down indicator 56 located on the front of the controller 10 will illuminate indicating that the low level probe 40c is free of debris and is operating properly. Once the positive blow down indicator has been illuminated, at 308, the blowdown should be continued for an additional twenty to thirty seconds, at 310. Next, the blowdown valve is closed, at 312, and the water level is allowed to rise to the point where the positive blowdown indicator 56 turns off, at 320. Then, at 322, the operator releases the blowdown bypass button 152 and allows the controller 10 to go back into normal operation. If the blow down bypass button 152 is depressed for more than two (2) minutes, the controller 10 will automatically reset itself and go back into normal operation.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept.

Automatic Boiler Level Controller

The automatic boiler level controller is a microprocessor based controller with a built in watch dog timer. The controller offers many self diagnostic and safety features. It has the ability to detect out of sequence probe indications and alert the operator of a problem with the controller's sensing circuit. Along with the out of sequence logic, the controller offers a positive blowdown circuit. During the blowdown, the controller will signal the operator that the alarm sensor has sensed steam. This feature ensures that the alarm probe is free of debris or build up. Although it uses proven conductivity technology to sense water level, the methodology of sensing the conductivity is very unique. The I/O (input/output) ports of the microprocessor and the charging and discharging of a capacitor through a resistive value senses the presence of water. The methodology is as follows:

DP – driving pin
SP1, SP2, SP3 – sensing pins 1, 2, 3
C1, C2, C3 – Capacitor 1, 2, 3

Configuration:
1. All pins are under microprocessor control making them input or output
2. Input has high impedance
3. Output has low impedance
4. DP is connected through SP1, SP2, SP3 through a small value capacitor (C1, C2, C3) respectively
5. SP2, SP2, SP3 is connected to probes 1, 2, 3

Sensing process
1. SP1, SP2, SP3 are made outputs and set high by the software
2. DP is made a output and set high by the software
3. Software waits long enough for C1, C2, C3 to go to steady state through a 100K ohm resistor
4. SP1, SP2, SP3 are all made inputs
5. DP is driven to zero volts (low) by the software
6. Software reads SP1, SP2, SP3
   - If the pin is high voltage, the probe is in water (voltage does not go through the 100K resistor)
   - If the pin is low voltage, the probe is in steam (voltage goes through the 100K resistor)
   -

These and other advantages over the prior art boiler level controllers are further described in the attached disclosure materials, which form a part of the specification of this provisional application.

CLARK·RELIANCE • JACOBY TARBOX
ANDERSON SEPARATOR • JERGUSON GAGE & VALVE
16633 FOLTZ INDUSTRIAL PARKWAY • STRONGSVILLE, OHIO 44136-6397

ABC-1000™ Automatic Boiler Level Controller

The ABC-1000, Automatic Boiler Level Controller is a microprocessor based controller designed to maintain optimum feed-water level in a boiler, provide low water level alarm and fuel cut-out. Personnel and equipment safety are its primary functions. This device is intended for use on Package Boiler Systems with a maximum design pressure of 450 psig

Features and Benefits

- Steam pressure to 450 WSP

- Column design allows for exact match of existing end to end dimensions

- High current load electromechanical relays allow for easy control of pump and alarm circuits

- Built in Positive Blow Down Indicator™ helps assure low level probe is operating properly during blow down

- Self diagnostic capability is standard - the result is enhanced safety

- Electronics can be remotely mounted for added flexibility

- No floats, linkages or mercury switches

- Automatic reset feature is standard, manual reset available

- Gage glass and gage glass cocks can be supplied as an option

MJT/ABC-1000 FLYER 6/12/00

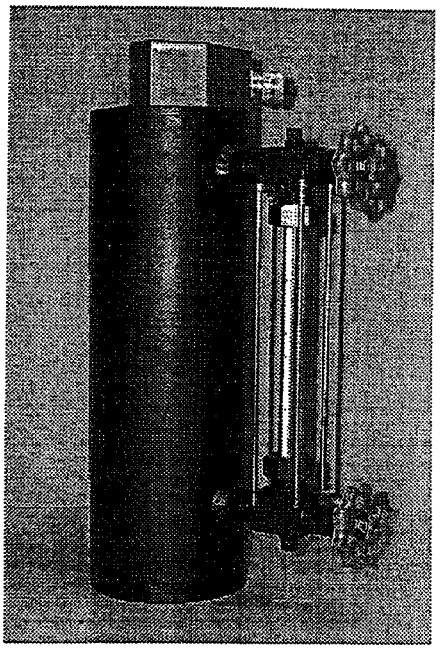

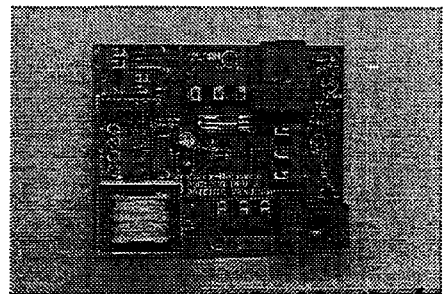

APPENDIX

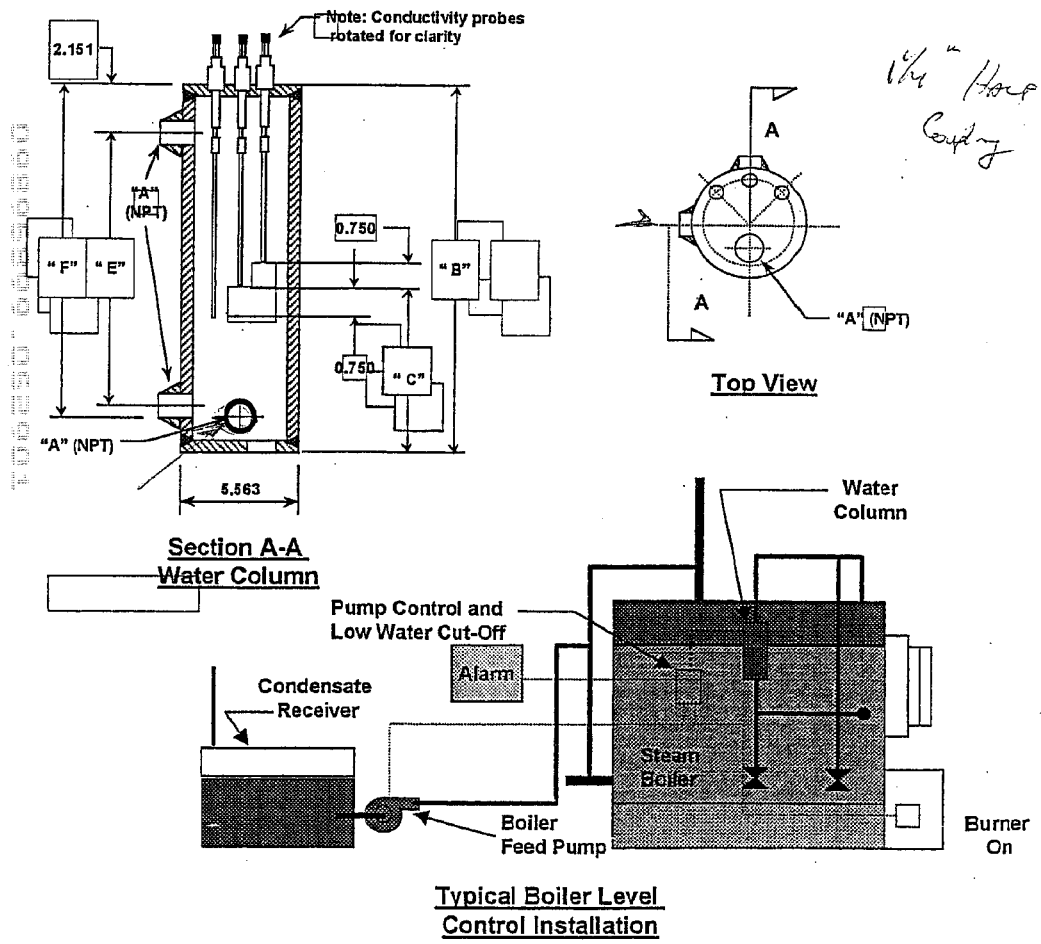

ABC-1000™ Automatic Boiler Level Controller

Specifications

Electronics: Input Voltage 115 VAC, 50-60Hz
Maximum Ambient Temperature: 60° C /140° F Contact Ratings: Pump Circuit

| | N.O. | N.C. |
|---|---|---|
| 115 VAC | 16FLA/60LRA | 5.8FLA/34.8 LRA |
| 230 VAC | 12FLA/50LRA | 4.9 FLA/20LRA |

Contact Ratings: Alarm/Fuel Cutoff

| | N.O. | N.C. |
|---|---|---|
| 115 VAC | 20A Resistive | 10A Resistive |
| 230 VAC | 20A Resistive | 10A Resistive |

| | |
|---|---|
| Contacts: | 2SPDT |
| Time Delay: | 0-30 sec-delay on make and break on *pump and alarm relays* |
| Reset Options: | Automatic or Manual |
| Approvals: | UL 353 recognized |
| Probe Column: | Standard |
| Column Material: | Carbon Steel - ASTM A106B |
| | - ASTM A285C |
| Probe Connection: | Integral 3/8" FNPT |
| Gage Glass Connection: | 1/2" FNPT OR 3/4" |
| Steam and Water Connections: | 1" or 1 1/4" FNPT Top and Bottom or Top and Side |

Maximum Working Pressure: 450 PSIG

How to Order
Contact your local Sales Representative or Clark-Reliance at (440) 572-1500

Model Number Code    RABC1000 __-__-__

A= Automatic Reset, M=Manual Reset
Time Delay in Seconds (00,01,02,04,08,16,32)
Column Designator (06,08,11,22)

Clark-Reliance 16633 Foltz Industrial Parkway • Strongsville, Ohio 44136-5597, USA
Telephone (440) 572-1500 • Fax (440) 238-8828
www.clark-reliance.com

*APPENDIX*

ABC-1000™ Automatic Boiler Level Controller

Controller Cover Front View with LED Indicators

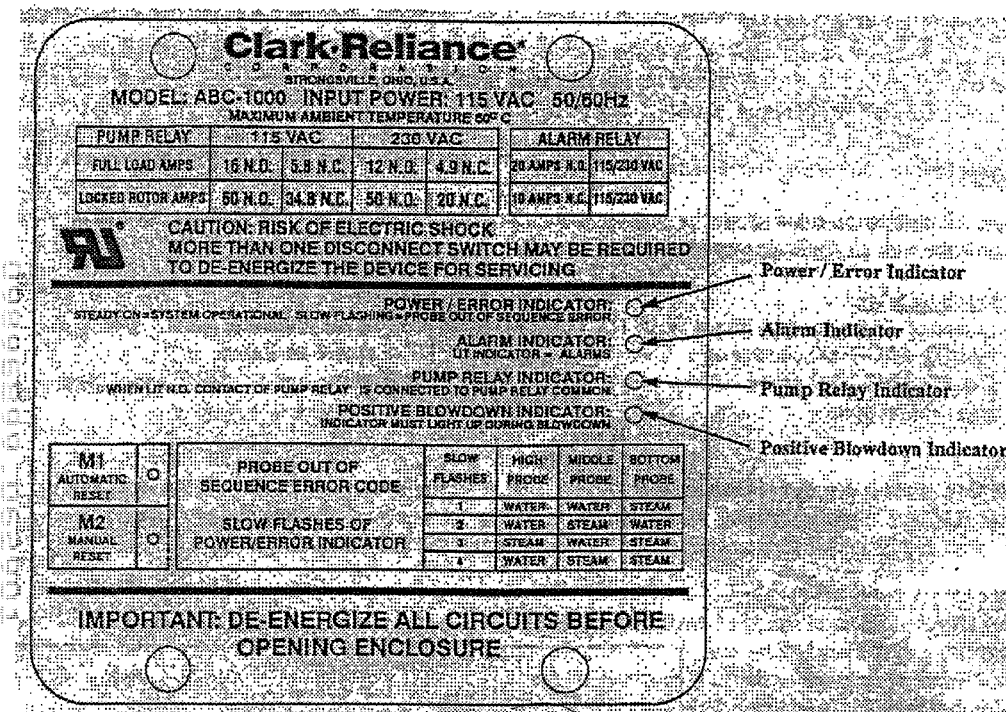

Recommended Practices Governing Governing
Water Column Installation and Operations

• Water columns should be mounted as close to the boiler as is practical for greatest accuracy.
• Piping between boiler and column causes a drop in water temperature (and corresponding increase in water density) at the column, with resulting lower level reading. Insulation of water columns and piping is helpful in reducing this water level difference.
• Water columns shall be fitted with a drain valve which in turn is piped to a safe disposal location.
• It is recommended that the drain valve be operated periodically to clear all passageways of scale and/or sediment.
• Provide for cleaning piping by installing crosses with plugs at all right angle turns

Clark·Reliance 16633 Foltz Industrial Parkway • Strongsville, Ohio 44136-5597, USA
Telephone (440) 572-1500 • Fax (440) 238-8828
www.clark-reliance.com

APPENDIX

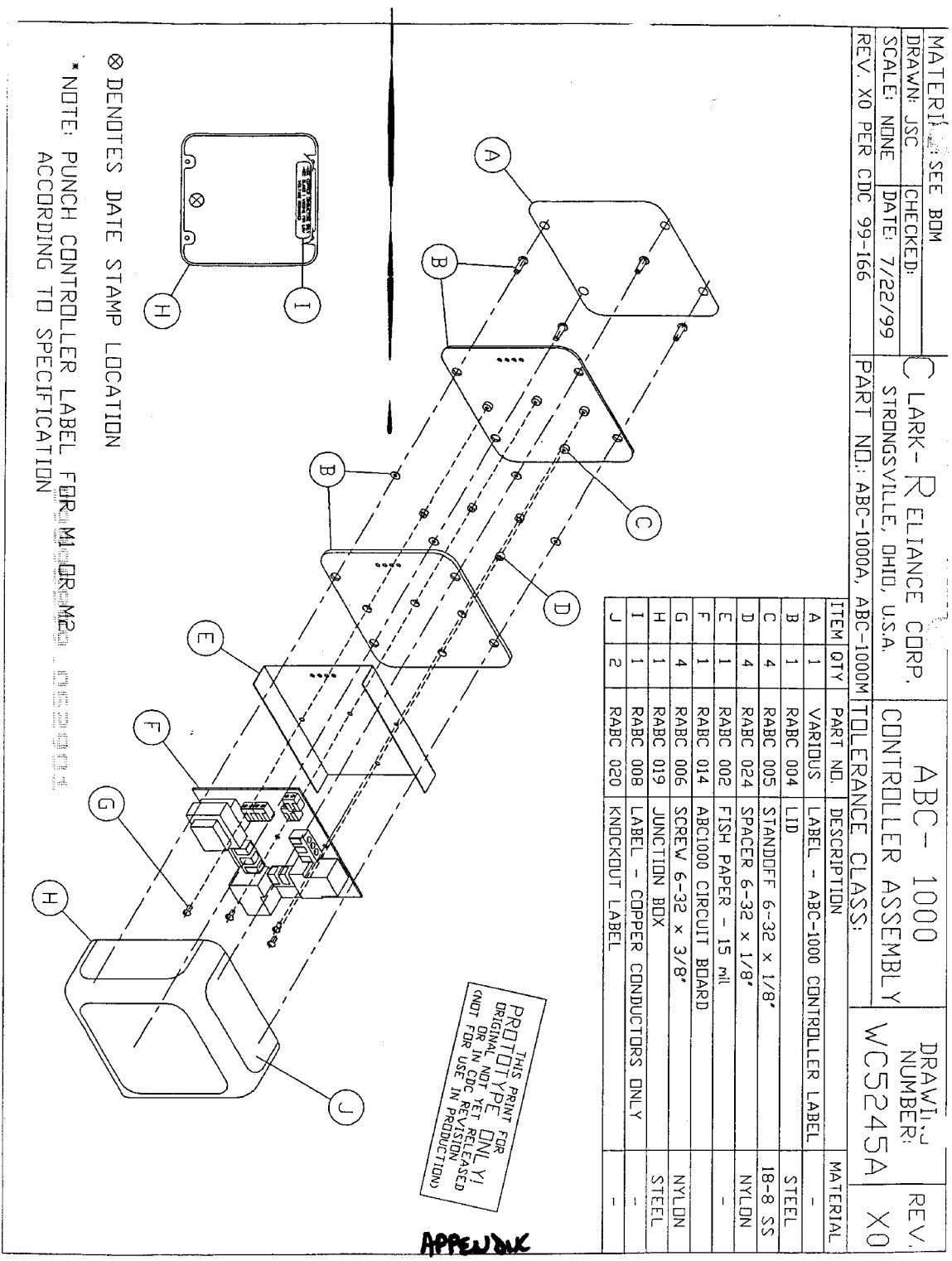

Clark·Reliance®
*QUALITY STEAM SPECIALTIES SINCE* 

ABC-1000
Automatic Boiler Level Controller
Operation and Installation Manual

| Section: C500 |
| Bulletin: C500.40 |
| Date: 03-16-00 |
| Supersedes: New |

PRODUCT DESCRIPTION:
The Clark-Reliance model ABC-1000 automatic boiler level controller has been designed to operate as a level control and a fuel cut-off / alarm for use on steam boilers that are designed up to 234° C at 450 PSIG and lower with a maximum ambient temperature of 60° C for the controller. The ABC-1000 has many self diagnostic features to help to ensure safe efficient boiler operation. Please familiarize yourself and the boiler operator with all of these features before completing the installation.

Note: All installation steps should be performed by a qualified technician and should be performed in accordance with all applicable national and local codes.

COMPONENTS
Upon receipt of this product please verify that you have received all of the following items.
1) One (1) ABC-1000 control unit. Control is housed in a 4 11/16 square enclosure.
2) One (1) ABC-1000 probe column with three 3/8" NPT probes installed and ½" FNPT water gage glass connections.

OPERATION
The ABC-1000 controller will maintain the water level in the boiler between the high and middle probe of the ABC-1000 probe column. If the water level falls to the low level probe in the ABC-1000 column the alarm and fuel cut-off circuit will be activated cutting off the fuel to the burner and sound an alarm.

INSTALLATION – Mechanical
The vertical position of the ABC-1000 probe column on the boiler is very important. *Improper positioning of the probe column could result in damage to the boiler and possible injury to operating personnel.* We recommend that all installation be done in accordance with the original boiler manufacture's recommendations. If no such recommendations exist, position the high level probe so that it matches the position of the normal water level in the boiler drum. By setting the high probe at the normal water level the ABC-1000 will maintain the water level between the high probe and the middle probe. The distance between the high and middle probe is ¼". The water

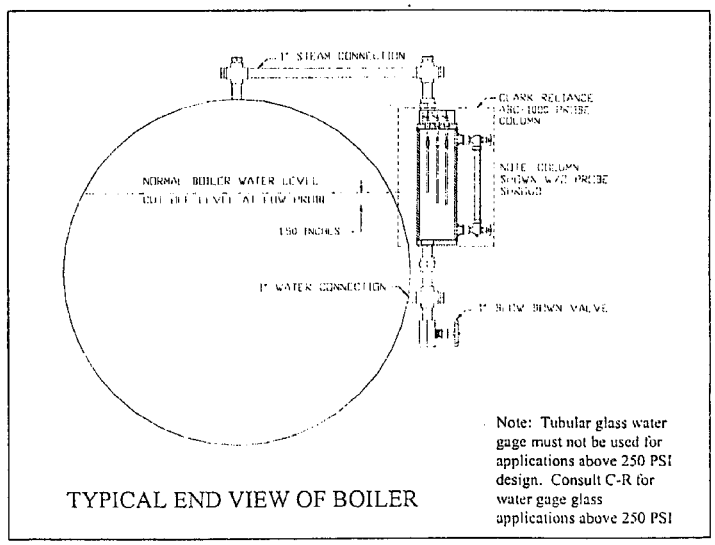

TYPICAL END VIEW OF BOILER

Note: Tubular glass water gage must not be used for applications above 250 PSI design. Consult C-R for water gage glass applications above 250 PSI level will be allowed to fall an additional ¼" to the low probe before the alarm circuit will be activated. The total distance between the high and low probe is 1 ½".

APPENDIX

INSTALLATION - Controller

CONTROLLER COVER FRONT VIEW

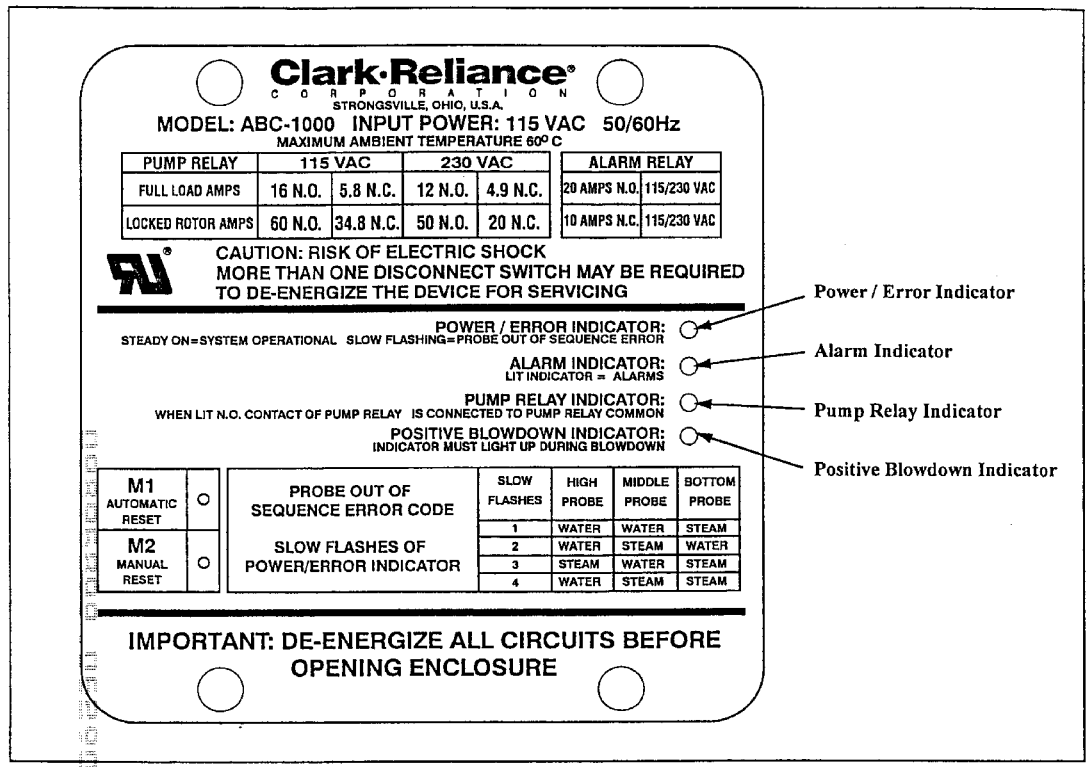

*Power/Error Indicator*
　　Steady on indicates normal operation. Slow blinking indicates an alarm condition. See tables 1 and 2 for error codes.

*ALARM RELAY Indicator*
　　When this indicator is lit an alarm condition exists. Observe the error code on the power/error indicator to diagnose error condition.

*PUMP RELAY (Energized) Indicator*
　　LED on indicates PUMP RELAY is energized and normally open contact is connected to relay common.

*Positive Blowdown Indicator*
　　Indicator lit indicates that the low probe is in steam. Blowdown should proceed until this indicator turns on to ensure that the low level probe is working properly.

INSTALLATION – Controller Continued

CONTROLLER COVER BACK VIEW

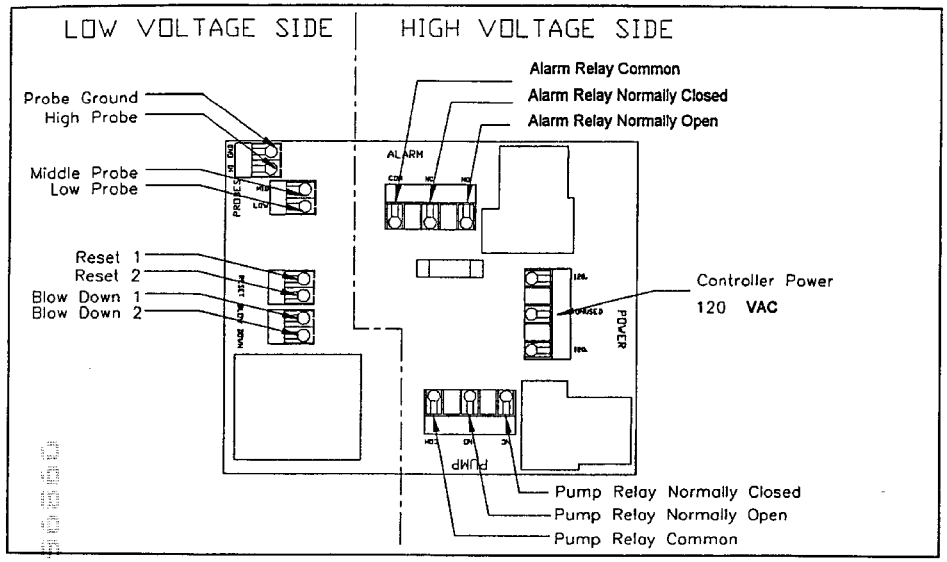

The electronics for the ABC-1000 are located on the backside of the ABC-1000's enclosure cover. The electronics are divided into two sides. The high voltage side and the low voltage side. The following list identifies and describes the components on the board.

HIGH VOLTAGE SIDE

*Controller Power 120 VAC*
  Terminal block connections for power to the controller electronics. The controller input voltage is factory set 120 VAC.

*Alarm Relay Common*
  Terminal block connection to (SPDT) ALARM RELAY COMMON.

*Alarm Relay Normally Closed*
  Terminal block connection to (SPDT) ALARM RELAY NORMALLY CLOSED contact. This contact makes connection to the Relay Common when an alarm condition occurs.

*Alarm Relay Normally Open*
  Terminal block connection to (SPDT) ALARM RELAY NORMALLY OPEN contact. This contact makes connection to the Relay Common when no alarm condition occurs.

*Pump Relay Common*
  Terminal block connection to (SPDT) PUMP RELAY COMMON.

Page 3 of 8

APPENDIX

INSTALLATION – Controller Continued

*Pump Relay Normally Open*
   Terminal block connection to (SPDT) PUMP RELAY NORMALLY OPEN contact. This contact makes connection to the Relay Common when liquid level falls below the middle probe level.

*Pump Relay Normally Closed*
   Terminal block connection to (SPDT) PUMP RELAY NORMALLY CLOSED contact. This contact makes connection to the Relay Common when liquid level reaches the high probe level.

NOTE: Use copper conductors only.

LOW VOLTAGE SIDE

*Blow Down 1 & Blow Down 2*
   Terminal block connections to a momentary, normally open switch. When Blow Down 1 is connected to Blow Down 2, the controller will stop controlling the relays. This switch contact is designed to allow the operator to blow down the probe column without tripping the fuel cut out and alarm circuit. The control will return to normal operation once the connection between Blow Down 1 and Blow Down 2 is broken or after a period of two minutes which ever comes first.

*Reset 1 & Reset 2*
   - Automatic Reset (M1)
   Terminal block connections to a jumper wire across Reset 1 and Reset 2. If an error is detected, once the level is above the low level probe, the alarm relay will automatically reset. After the error condition has been corrected the Alarm Normally Closed relay connection will once again be closed, and the Normally Open relay connection will be opened.
   - Manual Reset (M2)
   Terminal block connections to a momentary, normally open switch. After any error has been detected and corrected, connect Reset 1 to Reset 2 to reset the alarm relay. After Reset 1 is connected to Reset 2 and the error condition has been corrected the Alarm Normally Closed relay connection will once again be closed, and the Normally Open relay connection will be opened.

*High Probe*
   Terminal block connection to high probe

*Middle Probe*
   Terminal block connection to middle probe

*Low Probe*
   Terminal block connection to low probe

*Probe Ground*
   Terminal block connection to ground screw located on the ABC-1000's probe column.

NOTE: All low voltage wiring to the control requires to be wired using NEC Class 1 wiring.

EXAMPLE CONFIGURATION - Pump Control, Fuel Cutoff with Alarm.
In this example, the controller controls power to the pump to keep the water level between high and middle level probes. If the water level falls below the low probes or if a failure to sense water is detected the controller cuts power to the fuel control valve and sounds an alarm.

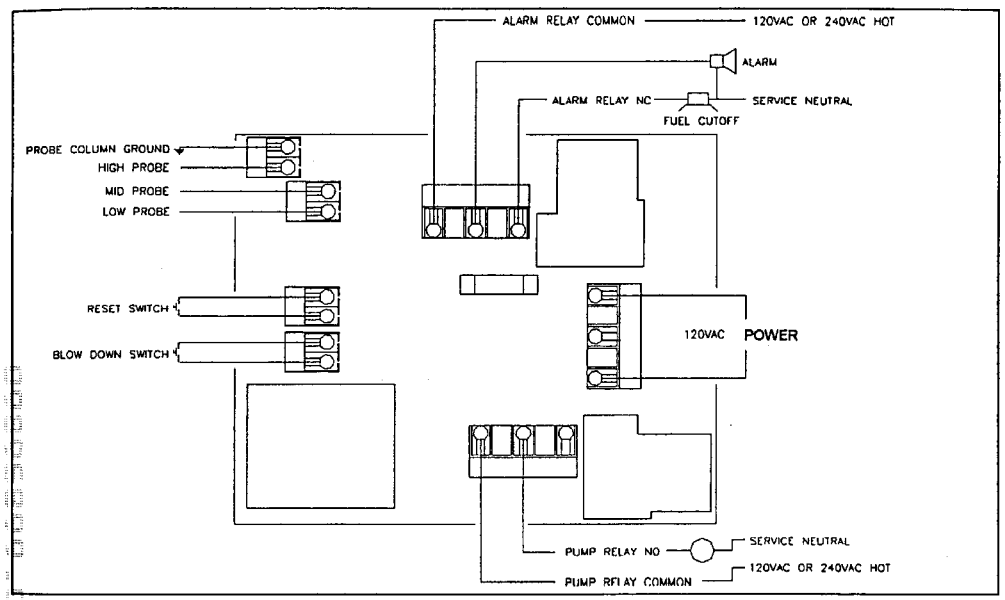

Power Connections
1. With the power off, connect 120VAC service wires to the two terminal block positions labeled "POWER 120VAC".

The input terminal block has three positions. Only two of the three positions are used. The center position is not to be used and is not connected to any circuits of the board.

Pump Connections
2. Connect the high voltage service wire to the terminal block position labeled PUMP COM (PUMP RELAY COMMON).

Connect the terminal block position labeled PUMP NO (PUMP NORMALLY OPEN) to the hot side of the pump motor or pump motor controller.

Connect the neutral side of the pump motor to the neutral service wire.

> NOTE: The ABC-1000 PUMP RELAY can directly control a motor rated for 16 full load Amps at 120VAC or 12 full load Amps at 240VAC. If the pump motor has a higher current rating, do not connect the pump directly to the ABC-1000 controller.

EXAMPLE CONFIGURATION - Pump Control, Fuel Cutoff with Alarm Continued.

Fuel Cutoff Connections
3. Connect the high voltage service wire to the terminal block position labeled ALARM COM (ALARM RELAY COMMON).

Connect the terminal block position labeled ALARM NO (ALARM RELAY NORMALLY OPEN) to the hot side of the fuel valve solenoid.

Connect the neutral wire from the fuel valve solenoid to the neutral service wire.

If an alarm is desired, connect the terminal block position labeled ALARM NC (ALARM NORMALLY CLOSED) to the hot side of the alarm. (Make sure that the alarm is rated for the same high voltage as the solenoid.)

Connect the neutral wire from the alarm to the neutral service wire.

NOTE: The ABC-1000 ALARM RELAY can directly control 20 full load resistive Amps at 120VAC or 240VAC. If the alarm or the fuel valve solenoid has a higher current rating, do not connect these directly to the ABC-1000 controller.

Probes Connections
4. Connect the terminal block position labeled PROBE GND to the grounding screw on the probe column.

Connect the terminal block position labeled PROBE LOW to the lowest of the three probes on the probe column.

Connect the terminal block position labeled PROBE MID to the middle probe on the probe column.

Connect the terminal block position labeled PROBE HI to the highest probe on the probe column.

Reset and Blow Down Switch Connections
5. For an Automatic reset alarm, connect the two terminal block positions labeled RESET with a jumper wire.
6. For a Manual reset alarm, connect the two terminal block positions labeled RESET to a normally open momentary switch.
7. Connect the two terminal block positions labeled BLOW DOWN to a second normally open momentary switch.

*NOTE: Momentary switches are not supplied by Clark-Reliance.*

*NOTE: Do not run wires from the low voltage probes, probe ground, reset and blow down switches in the same conduit as high voltage service wires.*

ERROR CODES

Out of Sequence Errors

The controller is able to diagnose problems with the probes and probe wires. When a problem occurs, the controller will put the ALARM RELAY into the alarm state and continuously flash an error code. The error code will show a number of sequential flashes, followed by a longer interval. The error code is repeated in this manner. When the error condition is resolved, the error state can be cleared by pushing a user installed reset switch. A reset switch will not clear the error state until the error condition is resolved. For example, if liquid level was above the middle probe, and the low probe were to become disconnected, then the controller would sense steam for the high probe, water for the middle probe, and steam for the low probe. The controller would then set the ALARM RELAY into the alarm state and flash the error code of three slow flashes.

TABEL 1

|             | PROBES |        |       |
|-------------|--------|--------|-------|
| Slow Flashes | High   | Middle | Low   |
| 1           | Water  | Water  | Steam |
| 2           | Water  | Steam  | Water |
| 3           | Steam  | Water  | Steam |
| 4           | Water  | Steam  | Steam |

General Errors

Along with the ability of the ABC-1000 to detect problems with the probes and probe wires it also has the ability to detect and display many other error conditions that may arise. The following is a description of the general errors that the ABC-1000 will detect.

*Blow Down Time Out*

If the N.O. momentary contact switch connected between the terminal block labeled "Blow Down" is held closed for more then two minutes then the ABC-1000 will go into and alarm state.

*System Hardware Errors I and II*

The ABC-1000 has the ability to detect faults that may occur with in its own circuitry. If this were to occur, a system hardware fault will be displayed on the indicator.

*Low Level Alarm*

This error will flash when under normal operation the low level probe senses steam.

TABEL 2

| Slow Flashes | Description            |
|--------------|------------------------|
| 5            | Blow Down Time Out     |
| 6            | System Hardware Error I |
| 7            | System Hardware Error II |
| 8            | Low Probe in Steam     |
|              |                        |

Blowdown

The ABC-1000 probe column must be blown down once a day. To perform the blowdown, first depress and hold the blowdown bypass button. Next, open the blowdown valve slowly. When the low level probe senses steam the positive blowdown indicator located on the front of the ABC-1000 will illuminate indicating that the low level probe is free of debris and is operating properly. Once the positive blow down indicator has been illuminated, the blowdown should be continued for an additional twenty to thirty seconds. Next, close the blowdown valve and allow the water level to rise to the point where the positive blowdown indicator turns off. Release the blowdown bypass button and allow the controller to go back into normal operation. If the blow down bypass button is depressed for more then two (2) minutes, the controller will automatically reset itself and go back into normal operation.

*For additional information, contact your local Clark-Reliance representative*

Clark·Reliance®  *APPENDY*

16633 FOLTZ INDUSTRIAL PARKWAY • STRONGSVILLE, OHIO 44136-5597 • USA
TELEPHONE: (440) 572-1500 • FACSIMILE: (440) 238-8828 • www.clark-reliance.com NOTE: Clark-Reliance shall not be liable for damages of any kind resulting in part from failure to install its products in accordance with all applicable codes and/or state and local regulations, improper application and/or maintenance.

©The Clark-Reliance Corporation, 2000

Printed in USA

What is claimed is:

1. A water level system, accepting input from at least one conductive level sensor and comprising a processor having at least one input port accepting input from the at least one conductive level sensor via a capacitive circuit including at least one capacitor, said processor determining whether the at least one conductive level sensor is in water or not by reading said input port to determine if said capacitor is charged or not; and wherein said processor determines whether the at least one conductive level sensor is in water or not by causing said capacitor to be charged and by then reading said input port to determine if said capacitor has been discharged by contact between the at least one conductive level sensor and the water or not.

2. A water level system, accepting input from at least one conductive level sensor and comprising a processor having at least one input port accepting input from the at least one conductive level sensor via a capacitive circuit including at least one capacitor, said processor determining whether the at least one conductive level sensor is in water or not by reading said input port to determine if said capacitor is charged or not;

wherein said processor determines whether the at least one conductive level sensor is in water or not by causing said capacitor to be charged and by then reading said input port to determine if said capacitor has been discharged or not; and wherein said processor further includes a second processor port and further wherein said processor charges said capacitor using at least said second processor port.

3. A water level system, accepting input from at least one conductive level sensor and comprising a processor having at least one input port accepting input from the at least one conductive level sensor via a capacitive circuit including at least one capacitor, said processor determining whether the at least one conductive level sensor is in water or not by reading said input port to determine if said capacitor is charged or not;

wherein said processor determines whether the at least one conductive level sensor is in water or not by causing said capacitor to be charged and by then reading said input port to determine if said capacitor has been discharged or not;

wherein said capacitive circuit is an RC circuit; and wherein said processor further includes a second processor port and further wherein said processor charges said capacitor using said second processor port.

4. A fluid level system, accepting input from at least one conductive level sensor and comprising a processor having at least one input port accepting input from the at least one conductive level sensor via a capacitive circuit including at least one capacitor, said processor determining whether the at least one conductive level sensor is in fluid or not by reading said input port to determine if said capacitor is charged or not; and wherein said processor determines whether the at least one conductive level sensor is in fluid or not by causing said capacitor to be charged and by then reading said input port to determine if said capacitor has been discharged by contact between the at least one conductive level sensor and the fluid or not.

5. A fluid level system, accepting input from at least one conductive level sensor and comprising a processor having at least one input port accepting input from the at least one conductive level sensor via a capacitive circuit including at least one capacitor, said processor determining whether the at least one conductive level sensor is in fluid or not by reading said input port to determine if said capacitor is charged or not;

wherein said processor determines whether the at least one conductive level sensor is in fluid or not by causing said capacitor to be charged and by then reading said input port to determine if said capacitor has been discharged or not; and wherein said processor further includes a second processor port and further wherein said processor charges said capacitor using at least said second processor port.

6. A water level system, accepting input from at least one conductive level sensor and comprising:

(a) a processor having at least one driver port and at least one sensing I/O port; and (b) a capacitive circuit connected to said at least one driver port and said at least one sensing I/O port and accepting input from the at least one conductive level sensor, said capacitive circuit having at least one capacitor; and (c) wherein said processor executes a software routine for determining whether the at least one conductive level sensor is in water or not, comprising the following steps:
  i. making the at least one sensing I/O port an output and setting its output HIGH;
  ii. setting the output of said at least one driver port HIGH;
  iii. making the at least one sensing I/O port an input;
  iv. setting the output of said at least one driver port LOW;
  v. reading the least one sensing I/O port input;
  vi. if the at least one sensing I/O port is at a first logical level, determining that the at least one conductive level sensor is in water; and
  vii. if the at least one sensing I/O port is at a second, different logical level, determining that the at least one conductive level sensor is not in water.

7. A water level system according to claim 6, wherein if the at least one sensing I/O port is HIGH, determining that the at least one conductive level sensor is in water and if the at least one sensing I/O port is LOW, determining that the at least one conductive level sensor is not in water.

8. A water level system according to claim 6 wherein said capacitive circuit is an RC circuit.

9. A fluid level system according to claim 6, wherein if the at least one sensing I/O port is HIGH, determining that the at least one conductive level sensor is in the fluid and if the at least one sensing I/O port is LOW, determining that the at least one conductive level sensor is not in the fluid.

10. A fluid level system, accepting input from at least one conductive level sensor and comprising:

(a) a processor having at least one driver port and at least one sensing I/O port; and (b) a capacitive circuit connected to said at least one driver port and said at least one sensing I/O port and accepting input from the at least one conductive level sensor, said capacitive circuit having at least one capacitor; and (c) wherein said processor executes a software routine for determining whether the at least one conductive level sensor is in fluid or not, comprising the following steps:
  i. making the at least one sensing I/O port an output and setting its output HIGH;
  ii. setting the output of said at least one driver port HIGH;
  iii. making the at least one sensing I/O port an input;

iv. setting the output of said at least one driver port LOW;
v. reading the least one sensing I/O port input;
vi. if the at least one sensing I/O port is at a first logical level, determining that the at least one conductive level sensor is in the fluid; and
vii. if the at least one sensing I/O port is at a second, different logical level, determining that the at least one conductive level sensor is not in the fluid.

* * * * *